June 2, 1959  F. W. SCHWING  2,889,174
EQUIPMENT FOR CONVEYING PULPY OR PLASTIC MATERIALS
Filed Feb. 13, 1956  5 Sheets-Sheet 1
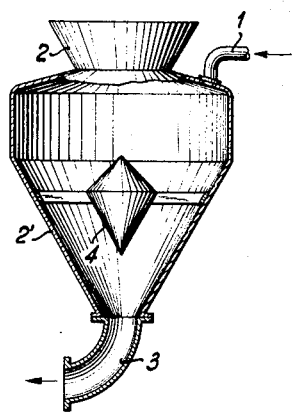
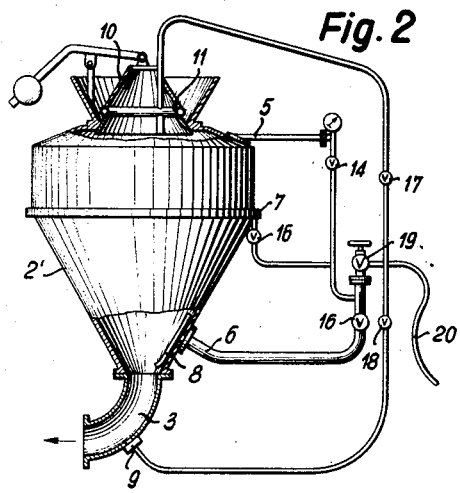
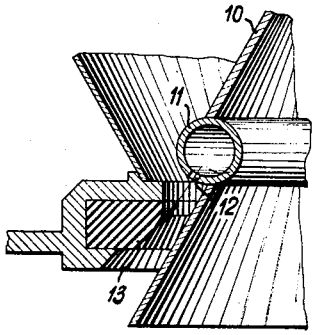
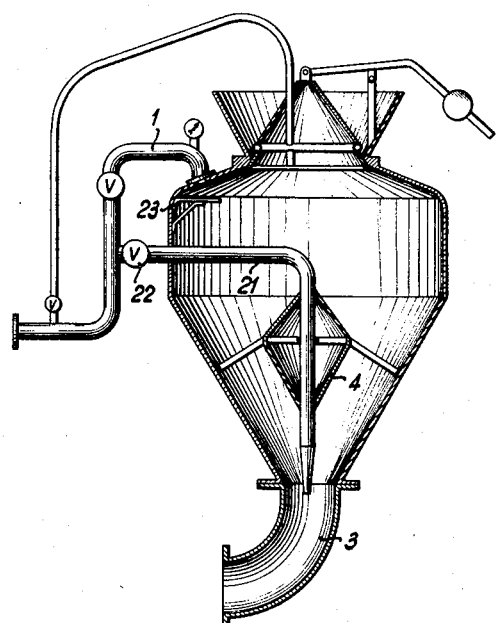
INVENTOR
F. W. Schwing
ATTYS.

June 2, 1959  F. W. SCHWING  2,889,174
EQUIPMENT FOR CONVEYING PULPY OR PLASTIC MATERIALS
Filed Feb. 13, 1956  5 Sheets-Sheet 2
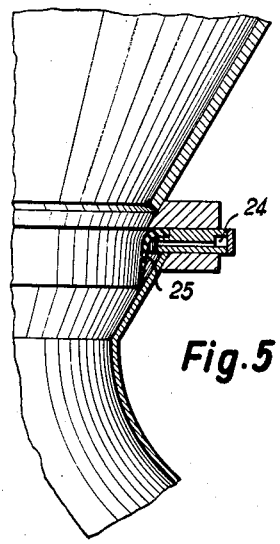
Fig. 5
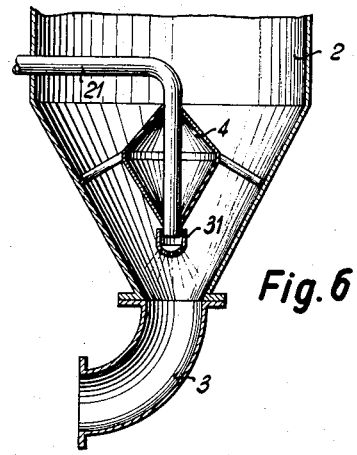
Fig. 6
Fig. 7
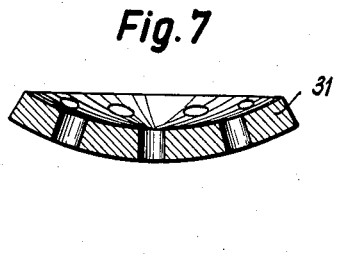
Fig. 8
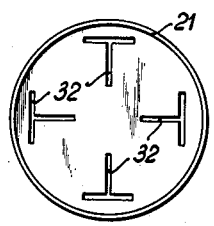
Fig. 9
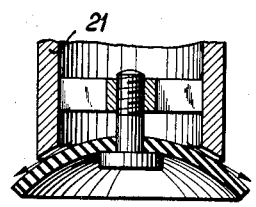
INVENTOR
F. W. Schwing INVENTOR
F. W. Schwing

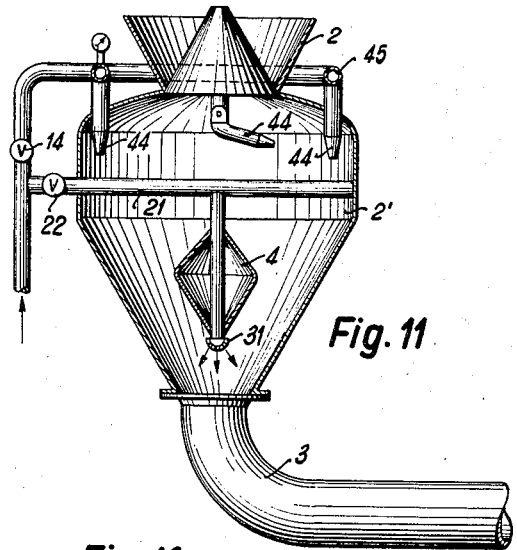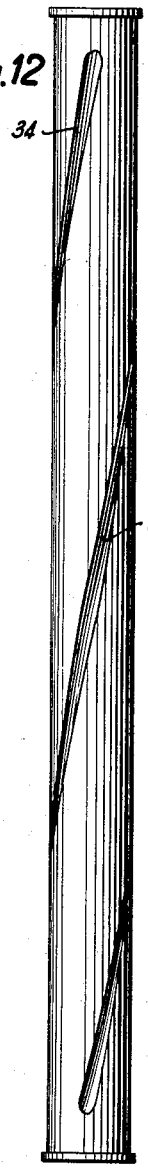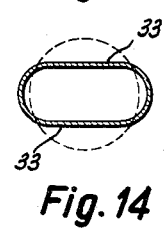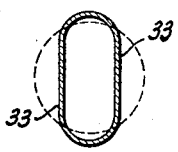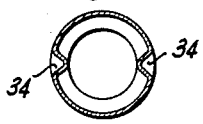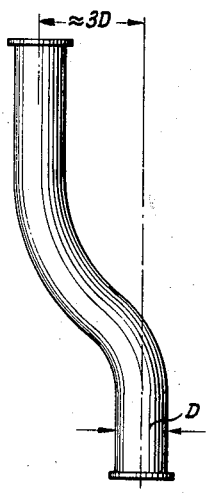

United States Patent Office 2,889,174
Patented June 2, 1959

2,889,174

EQUIPMENT FOR CONVEYING PULPY OR PLASTIC MATERIALS

Friedrich Wilhelm Schwing, Wanne-Eickel, Germany

Application February 13, 1956, Serial No. 565,250

Claims priority, application Germany February 17, 1955

10 Claims. (Cl. 302—17)

The present invention relates to pneumatic conveying equipment for the distribution of mortar and concrete from a feeder generally referred to as a batch pressure feeder through a pipe line to the site where the material is to be used.

In the case of mortar this method of conveying the material presents no difficulties because mortar is always of a pulpy and plastic consistency. However, in the case of concrete the particular composition of the stock and its frequently considerable stiffness call for special arrangements to ensure that the generally funnel-shaped pressure vessel is satisfactorily cleared and the material properly conveyed through the pipe.

Moreover, in known types of equipment, the steep angle required before a stiff stock will slip necessitates the provision of pressure feeders of considerable structural height, a factor which causes difficulties in the practical employment of such equipment apart from greatly increasing its cost.

The present invention permits pressure feeders of normal and even somewhat reduced structural height to be employed for reliably and economically conveying even stiff concrete mixtures irrespective of the manner in which the charge is withdrawn. At the same time the present invention eliminates choking as well as blow-through in the pressure vessel or the pipe line, which result in a discontinuous and jerky delivery of the material at the receiver end of the pipe—a factor which may cause excessive mechanical loading and the disruption of shuttering if, as is usually the case, the stock is directly placed into the moulds. The invention also permits concrete of varying consistency, that is to say semi-liquid stock as well as stock of the consistency of humid earth to be conveyed with a minimum consumption of air over any reasonable distance and gradients without impairing the uniformity in the rate of flow and the homogeneity of the mixture.

In conventional equipment of the kind referred to above the stock loaded into the feeder, which levels out to form a flat surface, is expelled by means of compressed air after the feeder vessel has been sealed. The central portion of the charge in the feeder will be displaced first but the remaining portions adjacent the walls are liable to be frictionally retained. As a result the air, after having cleared the central portion of the charge from the feeder can escape into the conveying pipe line without entraining the thick coat of stock that still hangs on the walls. The air therefore fails to empty the feeder effectively.

It is one of the features of the present invention that it overcomes this defect by disposing in the centre of the feeder a streamlined or like body in such manner as to leave an adequate annular space between the surface of the said body and the walls of the feeder and thereby to force the compressed air into this contracting annular channel where it can expel the stock with increasing speed into and then through the conveying pipe line.

According to another feature of the present invention, apart from the compressed air introduced at the head and the foot of the vessel, the removal of the stock adhering to the feeder walls is further assisted by the provision of equidistantly and peripherally distributed nozzles which direct jets of air into the feeder in a preferably downward direction.

These nozzles are arranged more particularly at points inside the feeder and near its discharge end where chocking is likely to occur. Moreover, with a view to the prevention of blow-through it is an advantage to cover the entry orifices of the air induction pipes with baffle plates. The provision of additional air entry points of appropriate disposition and design also permits the operation of the equipment to be adapted within practical limits to the type of concrete that is to be handled as well as to the gradients and distances over which the material is to be conveyed, merely by controlling the pressure and hence the volume of air delivered to the equipment.

Another possibility which falls within the scope of the present invention for ensuring the complete removal of the charge from the feeder by the introduction of additional air consists in equipping the inside of the pressure vessel with a sleeve of rubber or some similarly elastic or readily deformable material for the reception of the stock.

The material (concrete) loaded into the feeder stretches the elastic sleeve and pushes it against the inside walls. When the charge has been cleared from the feeder by compressed air the elastic sleeve tends to resume its original shape. The resumption of its shape by the sleeve will depend upon the rate at which internal pressure diminishes and therefore may be assisted by suitably controlling the volume of air delivered. To accelerate this effect compressed air may be introduced between the feeder wall and the sleeve. The two air spaces inside and outside the sleeve may be supplied in parallel from a common air supply pipe and a valve and a balanced pressure created on both sides of the sleeve. Alternatively, the compressed air may be introduced first into the space between the sleeve and the wall and thence into the interior, a check valve being adapted adjustably to maintain a higher pressure outside the sleeve than in its interior. Differential pressures may also be created by suitably tapping a common main air supply pipe.

The subject matter of the present invention further includes a novel form of construction of the pipe line which conveys the material from the batch pressure feeder as well as of the receiver equipment at the distant end of the line. This novel form of construction which requires a smaller overall consumption of air though its volume per unit of time is increased, is particularly adapted to the conditions created by the novel manner of feeding by compressed air and assists in maintaining the uniformity of the rate of travel and discharge of a thoroughly de-aerated stock.

The present invention creates the necessary conditions which are prerequisite to permitting the air that has been introduced to escape again at a uniform rate.

Details and further features of the present invention will be described with reference to a number of illustrative examples shown in the accompanying drawings, although it will be readily understood that the invention is not intended to be limited in any way to the examples that are about to be described. The scope of the invention includes many other possible forms of construction as well as variations and modifications thereof.

In the drawings:

Fig. 1 is a vertical section through a batch pressure feeder equipped with a flow deflector according to the invention;

Fig. 2 represents a similar feeder equipped with additional air entry ducts;

Fig. 3 is a detail of the feeder shown in Fig. 2, in vertical section;

Fig. 4 illustrates an alternative possibility of introducing compressed air to eliminate choking;

Fig. 5 is a form of construction shown on an enlarged scale of a flange with nozzles for the introduction of additional air;

Fig. 6 is a modified form of construction of the feeder;

Fig. 7 is a form of construction as shown in Fig. 6 with a central air induction pipe and jet cap;

Figs. 8 and 9 are alternative forms of construction of the jet cap;

Fig. 11 is an alternative form of construction of a pressure feeder to operate in conjunction with the pipe shown in Fig. 10;

Fig. 12 is a section of the conveyor pipe;

Figs. 13 to 15 are sections of various forms of construction of conveyor pipes;

Fig. 16 is another form of construction of the conveyor pipe;

Figure 10:
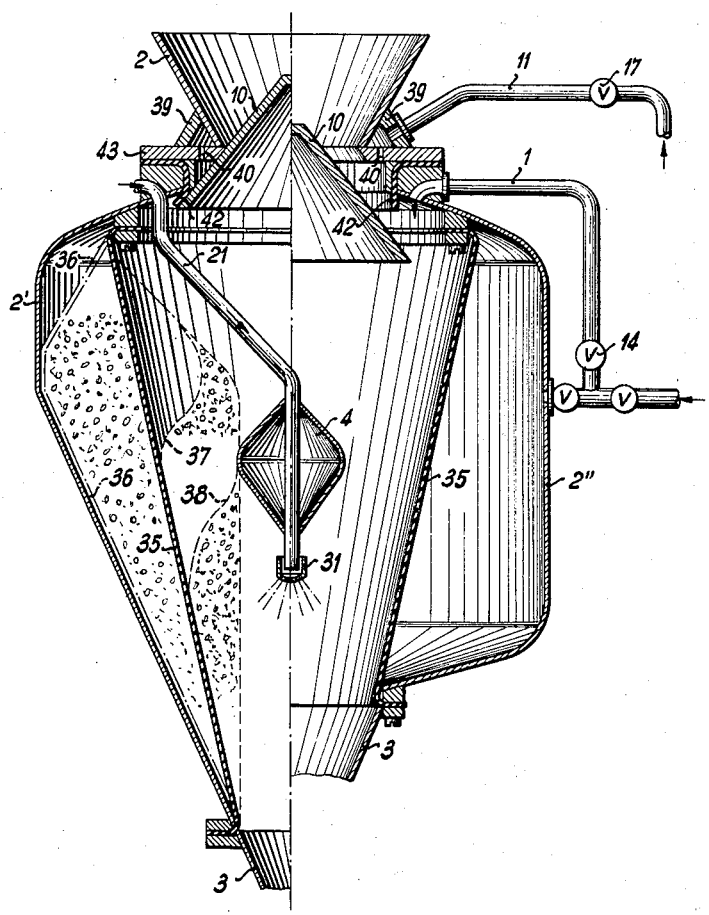
Fig. 10 is a form of construction of the conveyor pipe line.

In Fig. 1 the compressed air induction pipe is shown at 1, 2 is the cover, and 2' the body of the pressure feeder, whereas 3 is the outlet duct. Disposed in the lower, funnel-shaped, section of the pressure feeder is the deflector body 4 which has the shape of a double cone and forces the stock outwards into the annular channel as the compressed air entering through the induction pipe 1 forces it downwards.

In Figure 2 the customary air induction at the head of the feeder is shown at 5, with a further induction pipe 6 blowing air into the outlet duct at the lower end of the feeder in a manner already known. According to the invention a circular air duct 7 encircles the feeder at the point where its tapering section adjoins its upper cylindrical portion. This circular duct communicates with the interior through a number of orifices disposed equidistantly around the periphery of the walls. These orifices as well as the inlet opening for the induction pipe 6 are protected by traps 8 which prevent the concrete from entering and plugging the holes. The traps also ensure a better circumferential distribution of the compressed air and they further deflect the air mainly in the downward direction.

An air induction pipe 9 equipped with a non-return valve discharges in a manner already well known into the outlet duct 3 of the feeder. The feeder head can be closed by means of an airtight bell 10. According to the invention the latter is also equipped with a circular duct 11 which discharges compressed air through a number of orifices 12 into the annular gap between the bell and the adjacent sealing edge of the pressure vessel. This arangement allows any concrete that may have adhered to the sealing surfaces after a charge has been introduced into the feeder to be blown off so that the vessel may be closed without time being wasted by first having to wipe the sealing surfaces of the airtight joint.

The air induction pipes are equipped with control cocks 14, 15, 16, which allow the volume of air introduced through any of the air inlet openings to be adjusted as may be desired. 17 indicates the control cock for regulating the blower device on the bell 10, whereas 18 is the control cock for the air inlet 9 at the foot of the feeder into the outlet duct 3, and 19 is the main cock in the main induction pipe 20 for turning the air on and off.

In the form of construction of the pressure feeder shown in Fig. 4 special arrangements are made for the prevention of clogging at those points of the vessel where this is most likely to occur. These consist in the provision of further air inlet pipes or nozzle assemblies. To prevent the possibility of blow-through due to the force of the airjets the entry openings of these air inlets are shielded by baffle plates which prevent the jet from producing this unwanted effect.

A special air induction pipe 21 enters the pressure vessel and passes through the central deflector body 4 to the junction of the discharge duct where choking is most likely to occur. This induction pipe which feeds air continuously when the conveyor system is in operation or whenever the discharge duct becomes blocked receives its air directly via the control valve 22 and the pipe may conveniently serve to support the central deflector body as well.

A baffle plate 23 is also provided opposite the main air induction into the upper half of the vessel.

The detail shown in Fig. 5 is a section through a nozzle assembly 24 disposed in a flange forming an annular duct from which air is blown through a number of orifices distributed around the inner periphery of the vessel, the air jets impinging on an elastic collar-shaped blind 25 one edge of which is secured beneath the feed hopper for charging the pressure vessel. This blind which acts as a sealing ring at the same time prevents the orifices from being obstructed by the stock inside the vessel and it also deflects the air streams in a favourable direction for the propulsion of the stock. If the distances over which the stock must be conveyed are considerable, similar blower flanges may be provided in the conveyor pipe line.

Figs. 6 to 9 illustrate a special form of construction of the central air induction pipe 21 through the deflector body.

In this form of construction the outlet opening of the air induction pipe, which may, if desired, also be used in equipment which lacks the central deflecting body 4, is fitted with a jet cap 31 which causes the airstream to emerge in the form of a fan. As shown in Fig. 7 this cap may take the form of a curved perforated plate with diverging holes which direct a plurality of divergent airjets on to the stock.

An alternative form of construction of the jet cap is illustrated in Fig. 8. Here the end of the induction pipe 21 carries an elastic plate, made for instance of rubber. The plate is provided with slots of suitable shape, for instance of T-section, which are forced apart by the pressure of the impinging air and likewise produce a plurality of diverging airstreams.

In Fig. 9 the jet cap over the outlet opening of the induction pipe 21 consists of a cone-shaped body which may be created by drawing the centre of a previously flat plate into the mouth of the pipe so that it assumes the shape of a cup. Of course, the cap might be originally made to have the desired shape. The airstream will then force its way out between the edge of the mouth of the pipe and the outside surface of the cup to produce a hollow, umbrella-shaped, air jet as indicated in the drawing by the arrows.

The two forms of construction shown in Figs. 8 and 9 also act as non-return valves which prevent concrete from forcing its way into the induction pipe before the air pressure has been turned on.

Fig. 10 shows half sections of two further forms of construction of a pressure feeder according to the invention, which in addition to various incidental advantages offers the further material advantage of ensuring a very efficient and even discharge of the stock. This result is achieved by equipping the interior of the vessel with a somewhat funnel-shaped sleeve 35 made of an elastic material, preferably rubber, which at its lower extremity contacts approximately to the diameter of the outlet duct. When the vessel is loaded with concrete the sleeve expands and as shown at 36, more or less flattens itself against the inner wall of the pressure vessel.

When air is introduced on the one hand inside the sleeve and on the other hand into the space between the sleeve and the walls and the level of the concrete inside the vessel begins to sink, the sleeve tends to bulge inwards as indicated by the dotted lines at 37 and 38, the bulge gradually extending in the downward direction. The result of this is that any adhering quantities of concrete are thrown off and propelled into the conveyor pipe. The use of such sleeves which constitute an essential feature of the present invention eliminates the basic necessity of giving the pressure vessel the conventional tapering shape and permits its design to be dictated solely by considerations of holding capacity. An example of such a volumetrically improved form of construction is indicated in Fig. 10 at 2''. The illustrated shape of a pressure feeder permits its structural height to be reduced without affecting capacity, a factor of considerable importance to the practical user.

Such a sleeve may be used whether or not the vessel is fitted with a deflector body 4.

A further feature of the pressure vessel illustrated in Fig. 10 is the novel construction of the airtight seal for the cover (bell cap) which permits flexible tubing to be dispensed with which is otherwise necessary for making a connection between the blower pipe and the movable bell, inasmuch as a fixed blower pipe is now built into the vessel.

The annular duct formed between the foot of the hopper and the wall 39 feeds air to the blower holes 40 and the air jets from these blower holes blow any scraps of concrete from the sealing surfaces between the bell 10 and the edge of the vessel 41. The collar 42 round the edge of the vessel is splayed out by the rising bell 10 and scrapes off any residual pieces of concrete that may have stuck to the bell since the charging operation was completed.

The seal itself is created by the bell being tightly wedged into the collar by the air pressure inside. The inner edge of the flange 42 limits the upward movement of the bell. Fig. 11 illustrates a further possibility within the scope of the present invention of effecting the complete discharge of the material from the pressure feeder 2. According to this form of construction a plurality of nozzles 44 is disposed inside the vessel. These nozzles are supplied with compressed air through a pipe ring 45 controlled by a stop cock 14. The nozzles inject axial and tangential airjets into the pressure vessel and clear the walls of any material that may be adhering thereto.

Owing to the friction between the concrete and the wall of the conveyor pipe, which is greater in the lower half than in the upper half of the pipe, the upper portion of the originally continuous concrete plug will be forced along at greater speed than the lower portion, a factor which is likely to impair the uniformity of the mixture and may possibly lead to segregation of the components.

These troubles can be eliminated by the application of a further feature of the present invention, embodiments of which are illustrated in Figs. 12 to 16.

According to Fig. 12 the pipe line may be given a profiled section causing the concrete plug to revolve. Opposite sides 33 of the pipe are flattened, the flat sectors twisting around the conveyor pipe in the form of a helix. In other words, sections of the pipe line separated by a quarter convolution of the flattened sides will appear as shown in Figs. 13 and 14.

Alternatively, and as shown in Fig. 12, the same effect as that produced by the flattening of the pipe section may be achieved by impressing helical grooves or flutings into the pipe walls. Naturally, several such helices may be conjointly arranged on one pipe.

To facilitate the laying of the conveying pipes their ends may be of circular section as shown but it is quite possible to arrange for the helical surfaces to be continuous from one length of pipe to the next.

Another possibility of guarding against segregation of the concrete mixture by an application of the principle of changing the direction of propulsion is illustrated in Fig. 16 which shows how one or several pipe lengths may consist of two bends arranged in such manner that their straight ends are parallel so that the general direction of propulsion remains the same. It is preferred to design these bent sections in such a way that the lateral displacement of the pipe axis is equal to about three times the pipe diameter so that, on the one hand, blow-through which might occur if the displacement were too small is prevented and, on the other hand, the deviations from the general direction of the conveying pipe line are not excessive.

Figure 17:
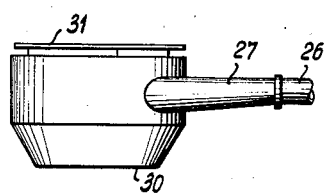
Figs. 17 to 19 are a side view, top view, and longitudinal section respectively of a preferred form of construction of the receiver.
Figure 18:
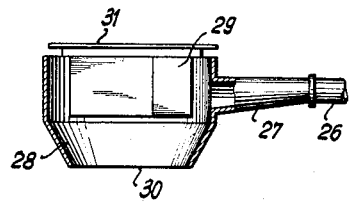
Figure 19:
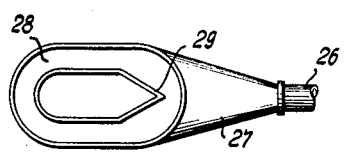

Figs. 17 to 19 are a side view, top view, and section, respectively of a preferred form of construction of the receiver at the delivery end of the pipe line 26. The arrangement as illustrated allows the larger quantities of air introduced when using a pressure feeder according to the present invention to escape continuously so as to ensure an even delivery of the stock. The material is discharged into the receiver through the enlarged end section 27 where it is parted into two streams by a wedge-shaped body 29 in the de-aerating shaft of the receiver 28. The two streams re-unite at the same speed and emerge through the delivery opening 30. It will be readily seen that this form of construction permits the occluded air to escape effectively through the de-aerating shaft 28. 31 indicates a cover which closes the upper air exit. The customary devices for attaching chutes and like means for distributing the material are not shown in the drawing.

Figure 20:
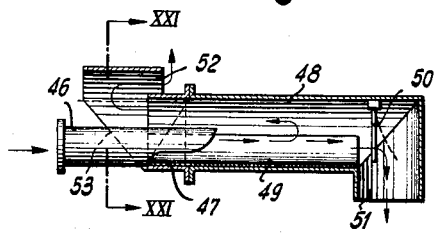
Figs. 20 and 21 are a diagram and section of yet another form of construction of a receiver for the delivery of concrete from the conveying pipe line.
Figure 21:
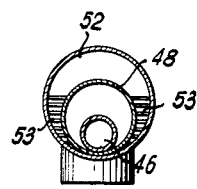

Figs. 20 and 21 show an alternative and particularly advantageous form of construction which ensures an even and continuous delivery of the concrete at the end of the conveying pipe. In these illustrations the conveyor pipe is indicated by 46. The lower half of the pipe is undercut at 47 to enable the air occluded in and behind the concrete plug to make an early escape. The stock itself continues to move forward solidly but its speed is retarded by a liner 49 for instance of rubber on the floor of the tubular jacket 48 into which the conveyor pipe discharges the material. If the braking effect of the liner should be insufficient, the stock is further effectively braked by a yielding baffle consisting for instance of rubber plates 50 which ensure that the stock is delivered smoothly and at much reduced speed through the delivery opening 51.

The air escapes at the opposite end of the jacket 48 through a vent 52 after changing direction several times, any entrained particles of concrete being returned to the main stream by sliding down the surface 53.

The present invention must not be understood as being limited to the simultaneous or conjoint use of all the various features that have been described, each individual feature offering its own particular advantage for the purpose of realising the principles which underlie the present invention.

I claim:

1. In pneumatic equipment for conveying pulpy or plastic materials and more particularly equipment for feeding concrete from a batch pressure feeder through a conveying pipe line to a receiver at the point of consumption, said pressure feeder comprising an air-tight conical vessel extending downwardly to a discharge opening at the apex thereof, a substantially concentric deflecting body in the form of a double cone disposed within the conical wall of said vessel so as to leave an annular gap between the said deflecting body and the conical wall of said vessel, with the upper portion of the double cone deflecting the material towards the walls of the pressure vessel, a supply opening in the top of said vessel, an air-tight bell closure for said supply opening, and means to supply compressed air to said vessel whereby the effect of the compressed air upon the batch material within the pressure vessel is confined to the said annular gap to propel said materials to said discharge opening.

2. Pneumatic equipment as claimed in claim 1, in which a ring pipe is provided from which compressed air can be blown through a number of channels through the annular gap between the bell closure and the sealing edge of the supply opening of the vessel.

3. Pneumatic equipment as claimed in claim 2, in which the blow holes for cleaning the sealing surfaces between the closure and the supply opening of the vessel are disposed in the cover of the pressure vessel.

4. Pneumatic equipment as claimed in claim 1, in which said means to supply air to said vessel includes a circular duct around the central region of the pressure vessel from which compressed air can be blown into the pressure vessel through a plurality of openings which are distributed around the circumference of the pressure vessel wall.

5. Pneumatic equipment as claimed in claim 4, in which the means to supply compressed air into the upper portion of the pressure vessel also includes a plurality of equidistantly arranged nozzles which produce axially and tangentially directed air jets.

6. Pneumatic equipment as claimed in claim 1, including a conveying pipe line connected to said discharge opening in which the conveying pipe line connected with said discharge opening of said vessel comprises a pipe length having a profile which causes the conveying material to rotate.

7. Pneumatic equipment as claimed in claim 6, in which a portion of the conveying pipe line is provided with helical flattened surfaces or flutings.

8. Pneumatic equipment as claimed in claim 1, wherein additional air induction ports are provided which discharge compressed air into the pressure vessel in those zones wherein choking is likely to occur.

9. In pneumatic equipment for conveying pulpy or plastic materials and more particularly equipment for feeding concrete from a batch pressure feeder through a conveying pipe line to a receiver at the point of consumption, said pressure feeder comprising an air-tight conical vessel extending downwardly to a discharge opening at the apex thereof, a substantially concentric deflecting body in the form of a double cone disposed within the conical wall of said vessel so as to leave an annular gap between the said deflecting body and the conical wall of the said vessel, with the upper portion of the double cone deflecting the material towards the walls of the pressure vessel, a supply opening in the top of said vessel, an air-tight bell closure for said supply opening, and means to supply compressed air to said vessel including an air induction pipe which discharges compressed air into the discharge opening of the pressure vessel and is so disposed as to pass centrally through the deflector body.

10. Pneumatic equipment as claimed in claim 9, in which the cap consists of an elastic cone-shaped body whereby a circular slit is formed between the outer surface of the said body and the edge of the induction pipe outlet.

References Cited in the file of this patent

UNITED STATES PATENTS

| | | |
|---|---|---|
| 2,400,194 | Day | May 14, 1946 |
| 2,530,689 | Egger | Nov. 21, 1950 |
| 2,792,262 | Hathorn | May 14, 1957 |

FOREIGN PATENTS

| | | |
|---|---|---|
| 325,544 | Great Britain | Feb. 21, 1930 |
| 330,681 | Italy | Oct. 22, 1935 |